United States Patent
Martensson et al.

(10) Patent No.: US 11,285,544 B2
(45) Date of Patent: Mar. 29, 2022

(54) ROCK DRILL INSERT

(71) Applicant: SANDVIK INTELLECTUAL PROPERTY AB, Sandviken (SE)

(72) Inventors: Malin Martensson, Nacka (SE); Ioannis Arvanitidis, Stockholm (SE); Krystof Turba, Nynashamn (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 0 days.

(21) Appl. No.: 16/337,388

(22) PCT Filed: Sep. 25, 2017

(86) PCT No.: PCT/EP2017/074193
§ 371 (c)(1),
(2) Date: Mar. 27, 2019

(87) PCT Pub. No.: WO2018/060125
PCT Pub. Date: Apr. 5, 2018

(65) Prior Publication Data
US 2020/0030886 A1 Jan. 30, 2020

(30) Foreign Application Priority Data
Sep. 28, 2016 (EP) .................... 16191046

(51) Int. Cl.
*B23B 27/14* (2006.01)
*B22F 3/15* (2006.01)
(Continued)

(52) U.S. Cl.
CPC .............. *B23B 27/148* (2013.01); *B22F 3/15* (2013.01); *B22F 3/24* (2013.01); *B22F 9/026* (2013.01);
(Continued)

(58) Field of Classification Search
CPC ... B24B 53/017; B24B 27/0633; B24B 57/02; B24B 37/00; B24B 37/042;
(Continued)

(56) References Cited

U.S. PATENT DOCUMENTS 5,881,828 A * 3/1999 Fischer ............... E21B 10/5673
175/374
7,427,310 B2 9/2008 Tillman et al.
(Continued)

FOREIGN PATENT DOCUMENTS

EP 1548136 A1 6/2005
EP 1697551 A1 9/2006
(Continued)

OTHER PUBLICATIONS

Gale, W.F. Totemeier, T.C.. (2004). Smithells Metals Reference Book (8th Edition)—Vickers Hardness Test. (pp. 3). Elsevier. Retrieved from https://app.knovel.com/hotlink/pdf/id:kt003OADJ7/smithells-metals-reference/vickers-hardness-test (Year: 2004).*
(Continued)

*Primary Examiner* — Pegah Parvini
(74) *Attorney, Agent, or Firm* — Corinne R. Gorski

(57) ABSTRACT

A rock drill insert made of cemented carbide having hard constituents of tungsten carbide (WC) in a binder phase including Co, wherein the cemented carbide includes 4-18 mass % Co and a balance of WC and unavoidable impurities. The cemented carbide also includes Cr in such an amount that the mass ratio Cr/Co is within the range of 0.04-0.19, and the difference between the hardness at a 0.3 mm depth at any point of the surface of the rock drill insert and the hardness of the bulk of the rock drill insert is at least 40 HV3.

13 Claims, 8 Drawing Sheets

(51) Int. Cl.
*B22F 3/24* (2006.01)
*B22F 9/02* (2006.01)
*B22F 9/04* (2006.01)
*B22F 5/00* (2006.01)

(52) U.S. Cl.
CPC .......... *B22F 9/04* (2013.01); *B22F 2005/001* (2013.01); *B22F 2202/01* (2013.01); *B22F 2302/10* (2013.01); *B22F 2998/10* (2013.01); *B22F 2999/00* (2013.01); *B23B 2222/28* (2013.01)

(58) Field of Classification Search
CPC ..... B24B 37/245; B24B 37/26; B24B 53/062; B24B 53/12; B24B 53/14; B24B 55/12; B24B 57/00; B22F 3/15; B22F 3/24; B22F 9/026; B22F 9/04
See application file for complete search history.

(56) References Cited

U.S. PATENT DOCUMENTS

| | | | |
|---|---|---|---|
| 9,739,095 | B2 | 8/2017 | Seppala |
| 2006/0093859 | A1 | 5/2006 | Konyashin et al. |
| 2008/0075621 | A1 | 3/2008 | Glatzle et al. |
| 2009/0110817 | A1* | 4/2009 | Collin .................... C22C 1/051 427/180 |
| 2010/0151266 | A1* | 6/2010 | Arvanitidis ............. C22C 29/08 428/546 |
| 2012/0177453 | A1* | 7/2012 | Konyashin .............. B22F 3/101 407/119 |
| 2015/0098855 | A1 | 4/2015 | Carpenter et al. |
| 2017/0268295 | A1 | 9/2017 | Rindeskar et al. |
| 2018/0274065 | A1* | 9/2018 | Konyashin ............. C22C 29/08 |

FOREIGN PATENT DOCUMENTS

| | | |
|---|---|---|
| EP | 2036997 A1 | 3/2009 |
| EP | 2184122 A1 | 5/2010 |
| EP | 2401099 A1 | 1/2012 |
| EP | 2638992 A1 | 9/2013 |
| EP | 2962793 A4 | 12/2016 |
| JP | 5309394 B2 | 10/2013 |
| RU | 2067152 C1 | 9/1996 |

OTHER PUBLICATIONS

Yigao Yuan et al: "Effects of WC Particle 1-13 Size and Co Content on the Graded Structure in Functionality Gradient WC-Co Composites", Matec Web of Conferences, vol. 67m Jan. 1, 2016, p. 06012.

Banerjee D et al: "Effect of Binder-Phase 1-13 Modification and CR3C2 Addition on Properties of WC-10CO Cemented Carbide", Journal of Materials Engineering and Performance, ASM International, Materials Park, OH, US, vol. 4, No. 5, Oct. 1, 1995.

\* cited by examiner

ROCK DRILL INSERT

RELATED APPLICATION DATA

This application is a § 371 National Stage Application of PCT International Application No. PCT/EP2017/074193 filed Sep. 25, 2017 claiming priority to EP Application No. 16191046.8, filed Sep. 28, 2016.

TECHNICAL FIELD

The present invention relates to a rock drill insert comprising a body made of a chromium containing WC—Co based cemented carbide wherein there is a significant hardness gradient between the surface and the bulk of the cemented carbide body.

BACKGROUND OF THE INVENTION

Rock drilling is a technical area in which the inserts which are used for the purpose of drilling in the rock are subjected to both severe corrosive conditions and repeated impacts due to the inherent nature of the drilling. Different drilling techniques will result in different impact loads on the inserts. Particularly severe impact conditions are found in applications such as those in which the rock drill inserts are mounted in a rock drill bit body of a top-hammer (TH) device, a down-the-hole (DTH) drilling device or a rotary drilling device.

The conditions to which the rock drill inserts are subjected during rock drilling also require that the rock drill inserts have a predetermined thermal conductivity in order to prevent them from attaining too high temperature.

Traditionally, rock drill inserts may consist of a body made of cemented carbide that comprises hard constituents of tungsten carbide (WC) in a binder phase comprising cobalt (Co).

The present invention arises from investigations of the effects of additions of chromium to the further components forming the cemented carbide, before the compaction and sintering of the compact. Thus, the cemented carbide of the rock drill insert contains chromium in its binder phase.

THE OBJECT OF THE INVENTION

It is an object of the present invention to present a rock drill insert which is improved in comparison to inserts of prior art made of WC—Co based cemented carbide in the sense that they have an improved corrosion resistance which reduces the wear in wet drilling conditions. Still the cemented carbide must have an acceptable hardness and ductility to withstand the repeated impact load that it will be subjected to during use. In other words, it must not be too brittle. Furthermore, it is an object to present a rock drill insert with both an increased wear resistance and an increased impact toughness reducing early damage and bending load failures.

Definitions

By the term "bulk" is herein meant the cemented carbide of the innermost part (centre) of the rock drill insert.

SUMMARY OF THE INVENTION

The object of the invention is achieved by means of a rock drill insert made of cemented carbide that comprises hard constituents of tungsten carbide (WC) in a binder phase comprising Co, wherein the cemented carbide comprises 4-18 mass % Co and balance WC and unavoidable impurities, characterized in that said cemented carbide also comprises Cr in such an amount that the Cr/Co mass ratio is 0.04-0.19, and, the difference between the hardness at 0.3 mm depth at any point of the surface of the rock drill insert and the minimum hardness of the bulk of the rock drill insert is at least 40 HV3.

The rock drill insert of the present invention is produced by means of a process in which a powder comprising the elements of the cemented carbide is milled and compacted into a compact which is then sintered. A grinding step to obtain the precise dimension of the drill insert is generally made. A drill insert of the present invention generally has a cylindrical base part and a rounded top which may be hemispherical, conical or asymmetric. Typically, the curved surface of the cylindrical base part is grinded to obtain the precise diameter wanted, while the surfaces of the top part and the circular base part are kept in their as sintered state. The drill insert is then subjected to post-treatment which introduces high levels of compressive stresses in the insert, such as a special high-energy oscillating collision process.

The combined effects of compressive stress induction and binder hardening have surprisingly been discovered being particularly strong for chromium-containing inserts both during the pre-application treatment in the high-energy oscillation collision process and also during the drilling application itself. Thus, rock drill inserts based on a chromium-containing cemented carbide of the present invention will provide a stronger surface hardening during actual drilling than rock drill inserts of cemented carbide not containing chromium.

The result is reduced wear and increased resistance towards breakage of the insert during use thereof. Also, the addition of Cr results in an improvement of the corrosion resistance of the Co-binder phase, which reduces the wear in wet drilling conditions.

If the mass ratio Cr/Co ratio is too low, the mentioned positive effects of Cr will be too small. If, on the other hand, the mass ratio Cr/Co ratio is too high, there will be a formation of chromium carbides in which cobalt is dissolved, whereby the amount of binder phase is significantly reduced and the cemented carbide becomes too brittle.

The WC grain size is chosen to suit the desired end properties of the cemented carbide in terms of, for example, thermal conductivity and non-brittleness of the cemented carbide. According to one embodiment the WC mean grain size is above 1 µm, or above 1.25 µm, or above 1.5 µm, or above 1.75 µm, or above 2.0 µm. If the WC grain size is too large, the material becomes difficult to sinter. Therefore, it is preferred that the WC mean grain size is less than 18 µm, or less than 15 µm, or less than 10 µm, or less than 5 µm. The WC mean grain size is determined with the method as described in the Examples section herein.

In one embodiment the cemented carbide comprises 4.5-15 mass % Co, or 5-12 mass % Co.

According to a preferred embodiment, the mass ratio Cr/Co is 0.075-0.15.

According to yet a preferred embodiment, the mass ratio Cr/Co is 0.085 to 0.15.

According to yet another preferred embodiment, the mass ratio Cr/Co is 0.085 to 0.12.

Even though the Cr is to a great extent present in the binder phase as dissolved in cobalt, some amount of undissolved chromium carbides, usually added as $Cr_3C_2$ in the production process, may remain in the cemented carbide. Up to 3 mass %, preferably up to 2 mass %, more preferably up to 1 mass %, chromium carbides (as added carbides, or $Cr_3C_2$) may be allowed in the cemented carbide. This means that in one embodiment the cemented carbide contains up to 3 mass %, preferably up to 2 mass %, more preferably up to 1 mass %, chromium carbides (as added carbides, or $Cr_3C_2$). If present, the mean grain size of the chromium carbides (as added carbides, or $Cr_3C_2$) is preferably below 1 µm.

In one embodiment, all added chromium carbides, or $Cr_3C_2$, are dissolved in cobalt, and the sintered cemented carbide is essentially free from undissolved chromium carbides (as added carbides, or $Cr_3C_2$). Preferably, to avoid the presence of such chromium carbides, the Cr/Co ratio should be low enough to guarantee that the maximum content of chromium does not exceed the solubility limit of chromium in cobalt at 1000° C.

In order to avoid the generation of chromium carbide or graphite in the binder phase, the amount of added carbon should be at a sufficiently low level.

Preferably, the sintered cemented carbide is free from any graphite and is also free from any η-phase.

According to yet another embodiment, $M_7C_3$ is present in the cemented carbide. In this case M is a combination of Cr, Co and W, i.e., $(Cr,Co,W)_7C_3$. The Co solubility could reach as high as 38 at % of the metallic content in the $M_7C_3$ carbide. The exact balance of Cr:Co:W is determined by the overall carbon content of the cemented carbide. The ratio $Cr/M_7C_3$ (Cr as weight % and $M_7C_3$ as vol %) in the cemented carbide is suitably equal to or above 0.05, or equal to or above 0.1, or equal to or above 0.2, or equal to or above 0.3, or equal to or above 0.4. The ratio $Cr/M_7C_3$ (Cr as weight % and $M_7C_3$ as vol %) in the cemented carbide is suitably equal to or less than 0.5, or equal to or less than 0.4. The content of $M_7C_3$ is defined as vol % since that is how it is practically measured. Expected negative effects in rock drilling by the presence of $M_7C_3$ cannot surprisingly be seen. Such negative effects in rock drilling would have been brittleness of the cemented carbide due to the additional carbide and also reduced toughness due to the lowering of binder phase (Co) content when $M_7C_3$ is formed. Thus, the acceptable range for carbon content during production of cemented carbide can be wider since $M_7C_3$ can be accepted. This is a great production advantage.

Rock drill inserts are subjected to intense impacts during use and traditionally a used rock drill insert is considered to be better (tougher) than a new, unused one since deformation hardening and build-up of compressive stresses have taken place at and near the surface of a used insert having been active in rock drilling. The risk of failure of the drill bit is therefore reduced for a used insert when compared with a new one. The present invention provides a rock drill insert which already from the beginning, as a new insert, presents a large difference in hardness between the surface of the rock drill insert and its interior, and the rock drill insert has a surface hardness more similar to a used insert. Therefore, a rock drill insert according to the present invention presents a lower risk of early damage and failure.

Also, the large difference in hardness between the surface of the rock drill insert and its interior is present over the whole surface and will therefore also reduce the risk of other types of failures during handling.

In one embodiment the difference between the hardness at 0.3 mm depth at any point of the surface of the rock drill insert and the minimum hardness of the bulk of the rock drill insert is at least 50 HV3, or at least 60 HV3, or at least 70 HV3, or at least 80 HV3, or at least 90 HV3.

The reason for using the hardness value 0.3 mm below the surface is that with the Vickers indentation method used, as described in Example 5, it is difficult to measure the hardness at the very surface.

In one embodiment the difference between the hardness at 0.3 mm depth at any point 0.3 mm below the surface of the rock drill insert and the hardness at 1 mm below the surface of the rock drill insert is at least 20 HV3, or at least 25 HV3, or at least 30 HV3, or at least 35 HV3.

In one embodiment there is at least one part of the rock drill insert where the difference between the hardness at 0.3 mm below the surface of the rock drill insert and the hardness of the bulk of the rock drill insert is at least 90 HV3, or at least 100 HV3, or at least 120 HV3.

In one embodiment there is at least one part of the rock drill insert where the difference between the hardness at 0.3 mm below the surface of the rock drill insert and the hardness at 1 mm below the surface of the rock drill insert is at least 30 HV3, or at least 35 HV3, or at least 40 HV3.

In one embodiment the difference between the average hardness at 0.3 mm below the surface of the rock drill insert and the average hardness at 1 mm below the surface of the rock drill insert is at least 30 HV3, or at least 35 HV3, or at least 40 HV3, or at least 45 HV3. The average hardness at a certain depth is defined as the average of at least 50 measured hardness values at the certain depth evenly distributed around the insert.

In one embodiment the difference between the average hardness at 0.3 mm below the surface of the rock drill insert and the average hardness in the bulk of the rock drill insert is at least 50 HV3, or at least 60 HV3, or at least 70 HV3, or at least 80 HV3. The average hardness at 0.3 mm depth is defined as the average of at least 50 measured hardness values at the certain depth evenly distributed around the insert.

The binder phase content of the cemented carbide is substantially equal throughout the rock drill insert, i.e., no substantial gradient of Co content is present when going from the surface of the rock drill insert to its interior. A slight difference in Co content may, however, appear in an uppermost zone between the surface and down to a depth of 0.2 mm.

The rock drill insert of the present invention has a Cr/Co mass ratio in the bulk within the range of 0.04-0.19

The rock drill insert of the present invention which has been subjected to post-treatment which introduces high levels of compressive stresses in the insert, such as the high-energy oscillating collision process, exhibits an increased magnetic coercivity (Hc) as compared with an untreated one, and also a significantly larger coercivity increase (ΔHc) than when conventional vibrational treatment is applied. For example, ΔHc-values of >5% and even >6% may be reached for a cemented carbide containing 6 wt. % Co and 0.6% wt. % Cr and >10% for a cemented carbide grade containing 11 wt. % Co and 1.1 wt. % Cr (see Examples 4 and 5). For the Cr-containing cemented carbide used in the drill inserts of the invention the increase in ΔHc corresponds well with the increase in impact toughness, as further shown in FIG. 16.

In one embodiment, the difference $\Delta Hc_{21}$ in % between the magnetic coercivity $Hc_2$ of the rock drill insert of the invention and the magnetic coercivity $Hc_1$ of a heat treated inner part of the rock drill insert, i.e. $((Hc_2-Hc_1)/Hc_1)*100$, divided by the cobalt content, i.e., $\Delta Hc_{21}/Co$, is >0.6, or $\Delta Hc_{21}/Co$ is >0.75, or $\Delta Hc_{21}/Co$ is >0.9, with the coercivity Hc in kA/m, $\Delta Hc_{21}$ in % and the cobalt content Co in weight %.

The magnetic coercivity $Hc_1$ is determined according to the following procedure: The outermost surface zone of a rock drill insert is removed (to a depth of about 1 mm below the original surface), using a suitable method such as centerless grinding, while keeping the approximate original shape of the insert. The insert with the surface zone removed is then annealed for about 2 h at about 1100° C. in an inert atmosphere. Following the annealing step, the magnetic coercivity is measured again, thus obtaining a value $Hc_1$ which can be seen as the reconstructed magnetic coercivity value for material's "as-sintered" state.

The rock drill insert of the invention must not be prone to failure due to brittleness-related problems. Therefore, the cemented carbide of the rock drill insert has suitably a hardness of the bulk of not higher than 1700 HV3, or not higher than 1650 HV3, or not higher than 1600 HV3.

The hardness of a cemented carbide depends on the WC grain size and the binder phase content. The cemented carbide of the rock drill insert has suitably a hardness of the bulk of at least 800 HV3, or at least 900 HV3, or at least 1000 HV3.

According to one embodiment, rock drill inserts according to the invention are mounted in a rock drill bit body of a top-hammer (TH) device or a down-the-hole (DTH) drilling device or a rotary drilling device or a cutting disc device. The rotary drilling device may be an oil and gas rotary cutter device. The invention also relates to a rock drill device, in particular a top-hammer device, or a down-the-hole drilling device, or a rotary drilling device, or a cutting disc device as well as the use of a rock drill insert according to the invention in such a device.

BRIEF DESCRIPTION OF THE DRAWINGS

Examples will be presented with reference to the annexed drawings, on which.

EXAMPLES

Figure 1:
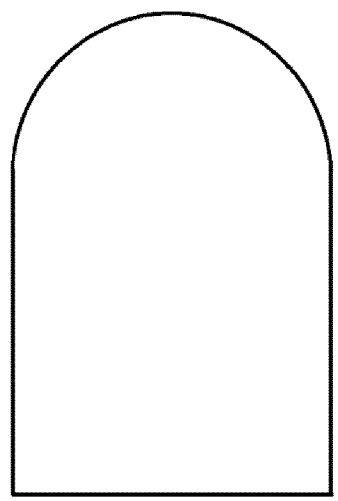
FIG. 1 is a schematic representation of the geometry of a rock drill insert used in testing.
Figure 2:
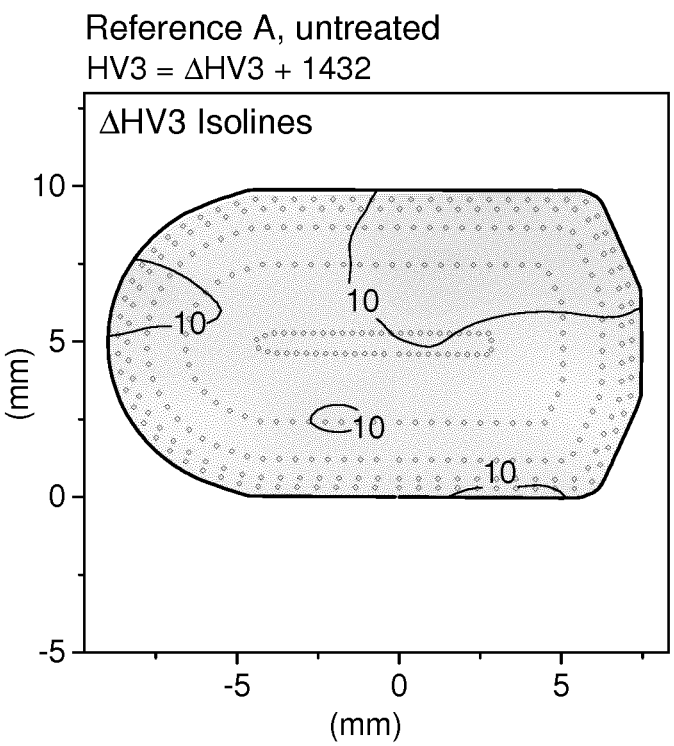
FIG. 2 shows a HV3 map of an untreated rock drill insert where the cemented carbide contains 6 wt % cobalt but no chromium (Reference A).
Figure 3:
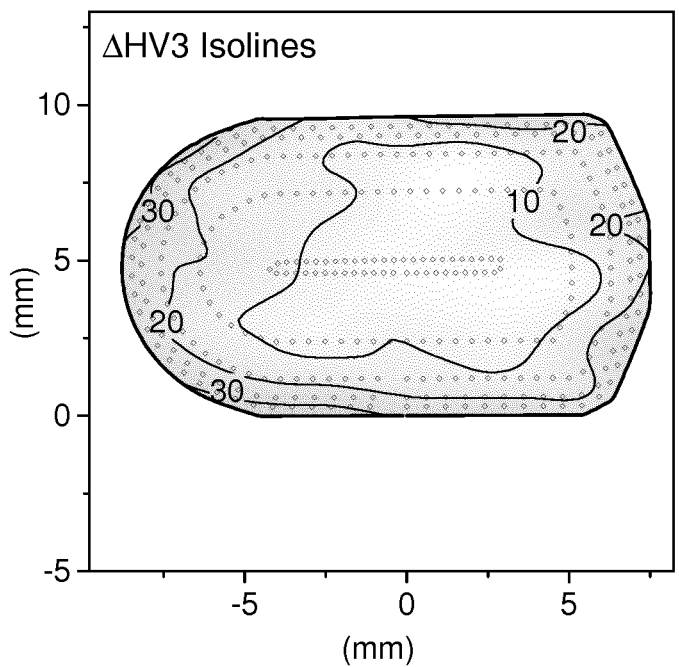
FIG. 3 shows a HV3 map of a vibrational tumbled rock drill insert where the cemented carbide contains 6 wt % cobalt but no chromium (Reference A).
Figure 4:
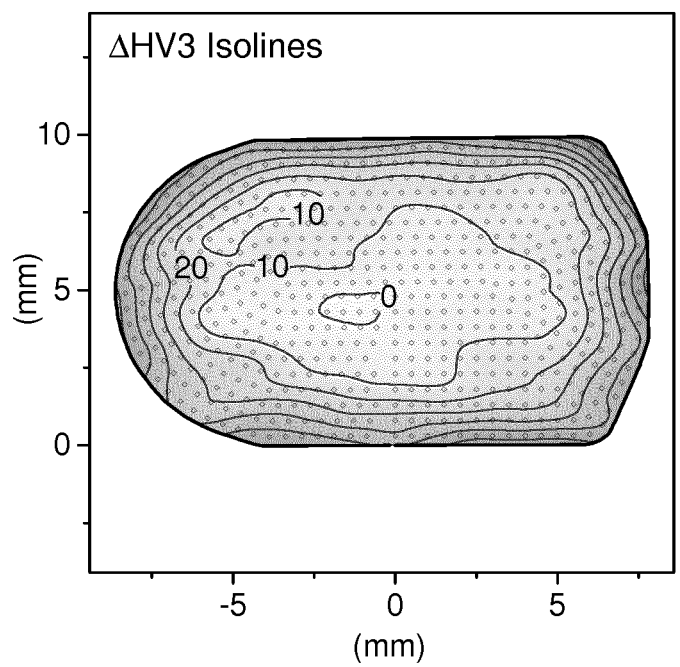
FIG. 4 shows a HV3 map of a high-energy oscillation collision treated rock drill insert where the cemented carbide contains 6 wt % cobalt but no chromium (Reference A).
Figure 5:
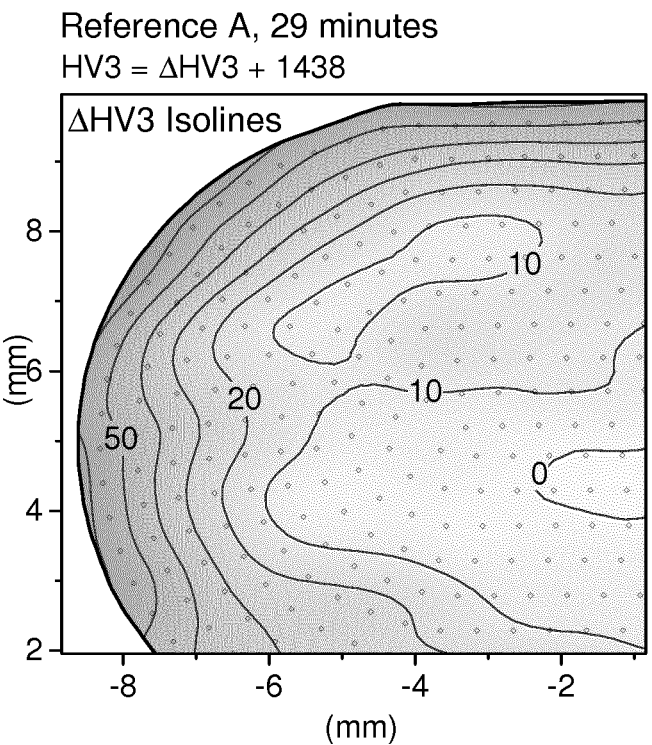
FIG. 5 shows an enlarged HV3 map of a part of a high-energy oscillation collision treated rock drill insert where the cemented carbide contains 6 wt % cobalt but no chromium (Reference A).
Figure 6:
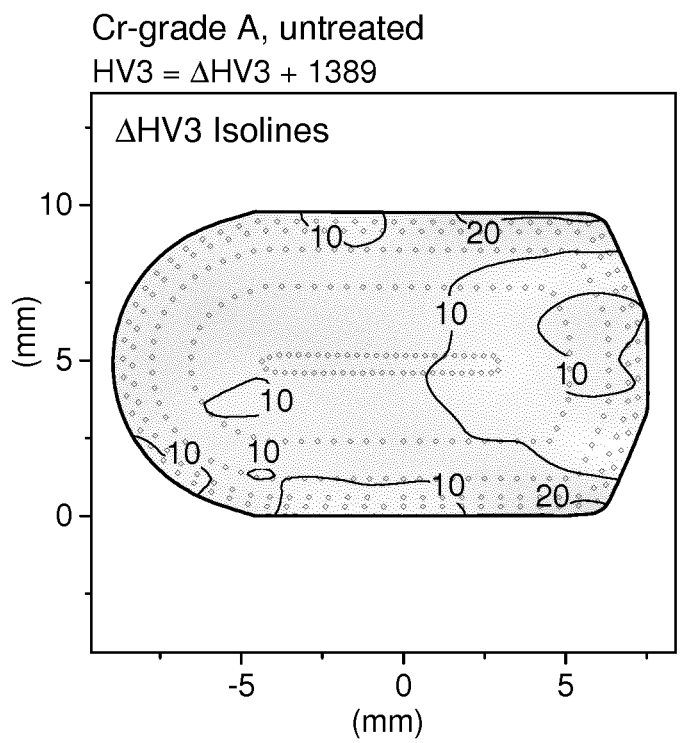
FIG. 6 shows a HV3 map of an untreated rock drill insert where the cemented carbide contains 6 wt % cobalt and chromium (Cr-grade A).
Figure 7:
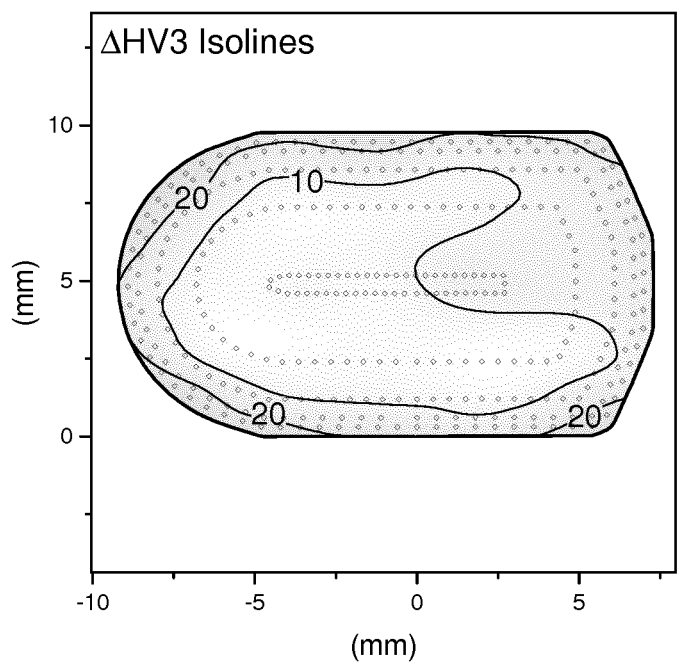
FIG. 7 shows a HV3 map of a vibrational tumbled rock drill insert where the cemented carbide contains 6 wt % cobalt and 0.6 wt % chromium (Cr-grade A).
Figure 8:
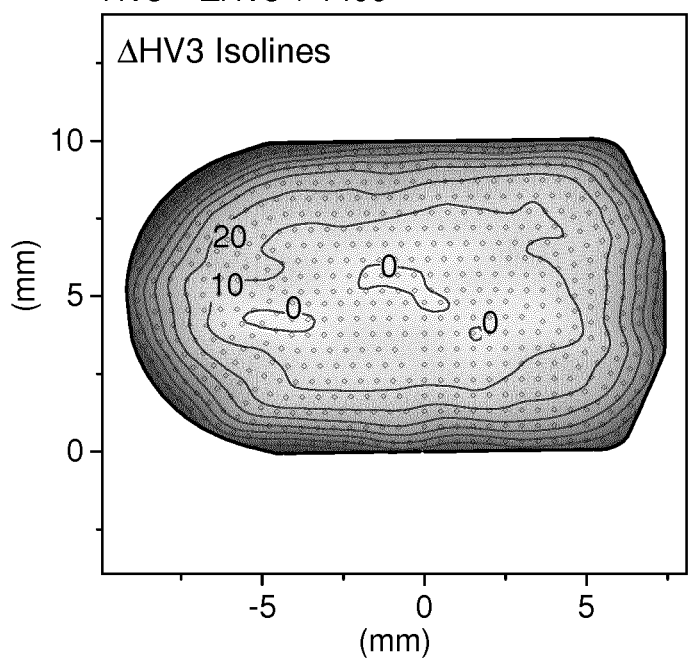
FIG. 8 shows a HV3 map of a high-energy oscillation collision treated rock drill insert where the cemented carbide contains 6 wt % cobalt and 0.6 wt % chromium (Cr-grade A).
Figure 9:
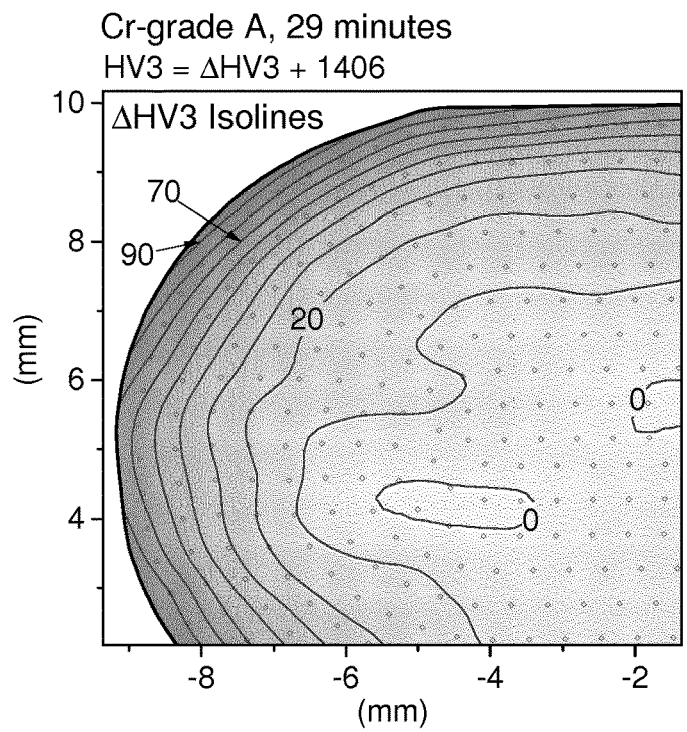
FIG. 9 shows an enlarged HV3 map of a part of a high-energy oscillation collision treated rock drill insert where the cemented carbide contains 6 wt % cobalt and 0.6 wt % chromium (Cr-grade A).

Example 1, Reference, Cemented Carbide without Cr

A material with 6.0 wt % Co and balance WC was made according to established cemented carbide processes. Powders of WC, Co and W were milled in a 600 l ball mill together with cemented carbide milling bodies for in total 13 hours. The milling was carried out in wet conditions, using 92% ethanol, with an addition of 2 wt % polyethylene glycol (PEG 8000) as organic binder. After milling, the slurry was spray-dried in $N_2$-atmosphere. Green bodies were produced by uniaxial pressing and sintered by using Sinter-HIP in 55 bar Argon-pressure at 1410° C. for 1 hour.

This material is denoted Reference A.

Details on the sintered material are shown in table 1.

Example 2, Cemented Carbide with Cr

A material with 6.0 wt % Co, 0.6 wt % Cr and balance WC was made according to established cemented carbide processes. Powders of 32.8 kg WC, 2.2 kg Co, 250 g $Cr_3C_2$ and 719 g W were milled in a ball mill for in total 13.5 hours. The WC powder grain size measured as FSSS was before milling 6.40 µm. During milling, 55.8 g C was added to reach the desired carbon content. The milling was carried out in wet conditions, using ethanol, with an addition of 2 wt % polyethylene glycol (PEG 8000) as organic binder (pressing agent) and 120 kg WC-Co cylpebs in a 30 litre mill. After milling, the slurry was spray-dried in $N_2$-atmosphere. Green bodies were produced by uniaxial pressing and sintered by using Sinter-HIP in 55 bar Ar-pressure at 1410° C. for 1 hour.

This material is denoted Cr-grade A.

The composition after sintering is given in Table 1.

Using SEM by backscattered electron detector, small amounts of nano sized $M_7C_3$ precipitations were found, typically at triple points between WC-grain boundaries and the binder phase and in sizes from 100-700 nm.

Example 3, Cemented Carbide with Cr

A material with 11.0 wt % Co, 1.1 wt % Cr and balance WC was made according to established cemented carbide processes. Powders of 37.7 kg WC, 3.15 kg Co, 358 g $Cr_3C_2$ and 863 g W were milled in a ball mill for in total 9 hours. The WC grain size measured as FSSS was before milling 15.0 μm. During milling, 19.6 g C was added to reach the desired carbon content. The milling was carried out in wet conditions, using ethanol, with an addition of 2 wt % polyethylene glycol (PEG 4000) as organic binder and 120 kg WC-Co cylpebs in a 30 litre mill. After milling, the slurry was spray-dried in $N_2$-atmosphere. Green bodies were produced by uniaxial pressing and sintered by using Sinter-HIP in 55 bar Ar-pressure at 1410° C. for 1 hour.

This material is denoted Cr-grade C.

Details on the sintered material are given in table 1.

TABLE 1

Details on materials produced according to examples 1-3.

|  | Reference | Cr-grades | |
| --- | --- | --- | --- |
|  | Ref. A | A | C |
| Co (wt %) | 6.09 | 6.07 | 10.98 |
| Cr (wt %) | — | 0.60 | 1.08 |
| C (wt %) | 5.75 | 5.78 | 5.41 |
| W (wt %) | 88.2 | 87.5 | 82.3 |
| He (kA/m) | 11.47 | 10.38 | 6.9 |
| Weight-specific saturation magnetism ($10^{-7}$ T*m³/kg) | 110 | 97 | 152 |
| Density (g/cm³) | 15.02 | 14.83 | 14.27 |
| Porosity | A00B00C00 | A00B00C00 | A00B00C00 |
| HV3* | 1462 | 1419 | 1157 |
| $K_{IC}$** | 11.0 | 11.1 | nm |

*Vickers indentations using 3 kg load
** Palmqvist fracture toughness according to ISO/DIS 28079

WC Grain Sizes of Sintered Samples of Examples 1-3

The mean WC grain size of the sintered materials Reference A, Cr-grade A, and Cr-grade C (examples 1-3) was determined from SEM micrographs showing representative cross sections of the materials. The final step of the sample preparation was carried out by polishing with 1 μm diamond paste on a soft cloth, followed by etching with Murakami solution. SEM micrographs were obtained using the back-scatter electron detector (BSE), at 15 kV acceleration voltage and a working distance of 10 mm. The magnifications used were 3000× for the materials Reference A and Cr-grade A, and 2000× for Cr-grade C.

The mean WC grain size was evaluated using the Jeffries method described below, from at least two different micrographs for each material. An average value was then calculated from the mean grain size values obtained from the individual micrographs (for each material respectively). The procedure for the mean grain size evaluation using a modified Jeffries method was the following:

A rectangular frame of suitable size was selected within the SEM micrograph so as to contain a minimum of 300 WC grains. The grains inside the frame and those intersected by the frame are manually counted, and the mean grain size is obtained from equations (1-3):

$$M = \frac{L_{scalemm} \times 10^{-3}}{L_{scalemicro} \times 10^{-6}} \quad (1)$$

$$vol\ \%\ WC = 100 \times \left(-1.308823529 \times \frac{\left(\frac{wt\ \%\ Co}{100} - 1\right)}{\left(\frac{wt\ \%\ Co}{100} + 1.308823529\right)}\right) \quad (2)$$

$$d = \frac{1500}{M} \times \sqrt{\frac{L_1 \times L_2 \times vol\ \%\ WC}{\left(n_1 + \frac{n_2}{2}\right) \times 100}} \quad (3)$$

Where:
d=mean WC grain size (mm)
$L_1$, $L_2$=length of sides of the frame (mm)
M=magnification
$L_{scale\ mm}$=measured length of scale bar on micrograph in mm
$L_{scale\ micro}$=actual length of scale bar with respect to magnification (μm)
$n_1$=no. grains fully within the frame
$n_2$=no. grains intersected by frame boundary
wt % Co=known cobalt content in weight %.

Equation (2) is used to estimate the WC fraction based on the known Co content in the material. Equation (3) then yields the mean WC grain size from the ratio of the total WC area in the frame to the number of grains contained in it. Equation (3) also contains a correction factor compensating for the fact that in a random 2 D section, not all grains will be sectioned through their maximum diameter.

Table 2 shows the mean WC grain size values obtained for the materials according to examples 1-3 with the above described procedure.

TABLE 2

| Sample material | Mean WC grain size (μm) (modified Jeffries method) |
| --- | --- |
| Reference grade A (According to example 1) | 1.9 |
| Cr-grade A (According to example 2) | 2.4 |
| Cr-grade C (According to example 3) | 3.3 |

Example 4, Treatments of Drill Inserts

Drill bit inserts were pressed and sintered according to the description in examples 1 and 2 respectively. The inserts had a size of 10.0 mm in outer diameter (OD) and 16.6 mm in height with a weight of approximately 16.6 g each and having a spherical dome ("cutting edge"). The inserts were ground on the negative part but leaving the dome and bottom part in an as-sintered condition. The batch was then divided and some of the inserts were treated using a standard vibrational tumbling (denoted as "VT" in figures and tables) to remove sharp edges created after the grinding. The vibrational tumbling method also induces a low amount of compressive stresses in the surface zone. This vibrational tumbling was carried out for 1.5 or 3 h in a vibrational mill together with a large excess (30 kg) of hard metal tumbling media of Sandvik grade 10HF with a hardness of around 1600 HV30 and 1 litre of water.

Some of the inserts were treated using a method that can best be described as a high energy oscillating collision method, hereafter referred to as the E-method. The equipment used is a commercially available paint shaker of trade mark Corob™ Simple Shake 90 with a maximum load of 40 kg and a maximum shaking frequency of 65 Hz. The E-method is based on a rapid oscillating movement of a closed container filled with inserts or a combination of inserts and tumbling media, wherein the container is repeatedly subjected to acceleration peaks typically up to 8.8 g at the shaking frequency of 45 Hz, where g=9.81 m/s². The oscillating movement occurs primarily along the z-axis, i.e. the vertical axis, with an amplitude of several cm, and simultaneous movement of lesser intensity along the y-axis in the horizontal plane. The inserts are set in motion by means of impacts with the walls of the moving container and subsequent impacts with other inserts and tumbling media. The high frequency of the velocity vector reversal (i.e. frequent abrupt changes in the direction of motion) results in a large number of high-energy insert collisions per unit of time. This characteristic property of the E-method makes it possible to obtain the desired effect in the treated inserts already after very short treatment times.

The program used for the E-method insert treatments corresponded to a shaking frequency of 45 Hz. 5-20 rock drill inserts were placed in hard and thermostable plastic container with double lids and dimensions of 133 mm in height and 122 mm in diameter, together with 3.0 kg media (hard metal pellets with a spherical top and bottom and a negative part in between; total height=6.95 mm, the height of the negative part being 3.22 mm and the diameter of the negative part=6.67 mm, of Sandvik grade H10F and with a weight of each pellet about 3 g) and 1-2 dl cold water for cooling. The filling height in the containers was about ⅓ and should not exceed ½. One to four containers were clamped automatically and the shaking was then started. The frequency used was 45 Hz and the shaking times were 9, 17, 29 and 60 min, respectively. To prevent the containers from excessive heating and melting, cooling of the containers had to be performed during the treatments with longest shaking times (29 and 60 min).

Magnetic Coercivity (Hc) Measurements (on Ref. A and Cr-Grade A)

The effect after the impact treatment can be characterized using different methods. The first method applied is the non-destructive measurement of change (increase) in magnetic coercivity (Hc) prior to and after the impact treatment using the commercial available equipment Foerster Koerzimat CS 1.096 following DIN IEC 50-221 (kA/m).

A part of the inserts were subjected to vibrational tumbling (VT) for 1.5 h prior to the E-treatment according to earlier descriptions and some were E-treated directly following the OD-grinding step. Both reference inserts (Reference A) and Cr-inserts (Cr-Grade A) were VT and E-treated exactly the same way. The settings and parameters used in the coercivity measurements are given in table 3. The results from the magnetic coercivity (Hc) measurements are included in the tables 4 and 5.

TABLE 3

Parameters and settings used in the coercivity (Hc) measurements

| Parameters and settings | |
|---|---|
| K-factor | 20460 1/m |
| Measure time | 3 s |
| Magnetize amplitude | 200 kA/m |
| Magnetize time | 3 s |
| Demagnetize amplitude | 100% |
| Magnetize pulse | No |
| Polarity | Plus |
| Both positions | Yes |

TABLE 3-continued

Parameters and settings used in the coercivity (Hc) measurements

| Parameters and settings | |
|---|---|
| Probe | outer |
| Nominal value | 10 kA/m |
| Form factor | 1 |
| Temperature limit | 5° C. |
| Intervention limit | 2% |
| Reject limit | 5% |
| Nominal value (Hr) | 1 A/m |
| Intervention limit (Hr) | 0.05% |
| Reject limit (Hr) | 0.1% |

TABLE 4

Reference A

| Treatment | Hc (kA/m) | ΔHc (%) | No. of samples |
|---|---|---|---|
| untreated (OD-ground) | 11.45 | 0 | 54 |
| VT 1.5 h | 11.61 | 1.38 | 12 |
| VT 3 h | 11.61 | 1.38 | 10 |
| VT + 9 min E | 11.86 | 3.57 | 6 |
| VT + 17 min E | 11.97 | 4.55 | 6 |
| VT + 29 min E | 12.03 | 5.33 | 3 |
| 17 min E | 12.00 | 4.81 | 7 |
| 29 min E | 12.13 | 5.91 | 10 |
| 60 min E | 12.22 | 6.72 | 10 |

TABLE 5

Cr-grade A

| Treatment | Hc (kA/m) | ΔHc (%) | No. of samples |
|---|---|---|---|
| untreated (OD-ground) | 10.33 | 0 | 54 |
| VT 1.5 h | 10.47 | 1.4 | 12 |
| VT 3 h | 10.71 | 1.4 | 10 |
| VT + 9 min E | 10.76 | 3.8 | 6 |
| VT + 17 min E | 10.75 | 4.1 | 7 |
| VT + 29 min E | 10.89 | 5.5 | 3 |
| 17 min E | 10.75 | 4.1 | 7 |
| 29 min E | 10.87 | 5.3 | 10 |
| 60 min E | 10.97 | 6.2 | 10 |

In tables 4 and 5: ΔHc in percentage is calculated as:

$$\Delta Hc = ((\text{Average } Hc(\text{Treated}) - \text{Average } Hc(\text{OD-ground}))/\text{Average } Hc(\text{OD-ground}))*100.$$

For standard tumbling processes the increase in Hc for a 6% Co grade is typically between 0.5-1.5% in ΔHc and even with further prolonged process time no further increase can be achieved as seen in table 3 and 4, where the Hc increase is the same after 1.5 h as after 3 h of vibrational tumbling. To achieve even higher induced stresses more energy is needed and high energy tumbling processes give an Hc increase of about 4% but to further increase the energy without damaging the inserts is difficult; however, with the E-method ΔHc-values of >5% and even >6% have been reached for a 6% Co-grade without damaging the inserts and with relative short process times.

Hardness Measurements (on Ref. A and Cr-Grade A)

Alternatively, the hardening induced by the high energy surface treatment can be characterized by means of performing Vickers hardness mapping. The inserts are sectioned along the longitudinal axis and polished using standard procedures. Vickers indentations at 3 kg load are then systematically distributed over the polished section. For a more detailed description of the applied method, see below:

The hardness measurements were performed using a programmable hardness tester, KB30S by KB Prüftechnik GmbH calibrated against HV3 test blocks issued by Euro Products Calibration Laboratory, UK. Hardness is measured according to ISO EN6507. HV3 means 3 kg load, HV5 means 5 kg load, etc.

The HV3 measurements were done in the following way:
Scanning the edge of the sample.
Programming the hardness tester to make indentations at defined distances to the edge.
Programming the distances between the indentations to 0.3 mm or more.
Indentation with 3 kg load at all programmed coordinates.
Computer moves stage to each coordinate with indentation and runs auto adjust light, auto focus and then auto measure the size of each indentation.
User inspects all photos of the indentations for focus and other matters that disturb the result.

Actual distance could be found out in the figures by measuring the distance between the "◊" symbols that mark the actual location of the HV3 indentation in the figure and then correlating with the mm scale given in the X and Y axis.

FIG. 2-9 show hardness maps (HV3 maps) of the results of the indentations made for Reference A and Cr-grade A.

Tables 6-7 show the ten measured minimum hardness values and the ten measured maximum hardness values out of about 390 measured hardness values on each sample examined. Some samples were measured with about 600 indentations. This shows that there are some very hard surface zones present.

TABLE 6

| Reference A 29 min E | | Cr-grade A 29 min E | |
|---|---|---|---|
| HV3min[1] | HV3max[2] | HV3min[1] | HV3max[2] |
| 1412 | 1513 | 1384 | 1501 |
| 1415 | 1516 | 1384 | 1501 |
| 1415 | 1516 | 1384 | 1501 |
| 1421 | 1523 | 1387 | 1501 |
| 1421 | 1523 | 1387 | 1501 |
| 1423 | 1523 | 1390 | 1504 |
| 1423 | 1526 | 1390 | 1504 |
| 1423 | 1529 | 1393 | 1510 |
| 1423 | 1532 | 1393 | 1513 |
| 1423 | 1555 | 1393 | 1516 |

[1]Measured in the bulk (4.8 mm below the surface)
[2]Measured at 0.3 mm below the surface

TABLE 7

| Reference A 60 E | | Cr-grade A 60 min E | |
|---|---|---|---|
| HV3min[1] | HV3max[2] | HV3min[1] | HV3max[2] |
| 1426 | 1535 | 1379 | 1507 |
| 1426 | 1539 | 1390 | 1510 |
| 1429 | 1539 | 1393 | 1513 |
| 1432 | 1539 | 1395 | 1513 |
| 1432 | 1542 | 1395 | 1513 |
| 1432 | 1545 | 1398 | 1516 |
| 1435 | 1551 | 1398 | 1519 |
| 1435 | 1551 | 1398 | 1519 |
| 1435 | 1555 | 1398 | 1523 |
| 1435 | 1565 | 1401 | 1542 |

Figure 10:
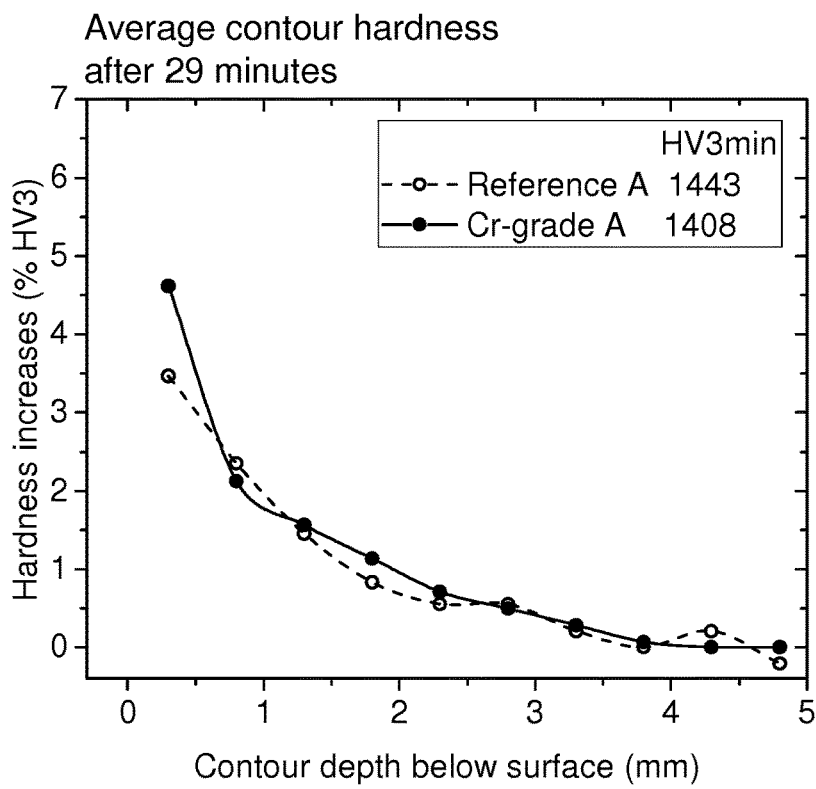
FIG. 10 shows HV3 profile curves for high-energy oscillation collision treated rock drill inserts of Reference A and Cr-grade A.

[1]Measured in the bulk (4.8 mm below the surface)
[2]Measured at 0.3 mm below the surface The average hardness per contour for Reference A and Cr-grade A after treatment with the E-method for 29 minutes was also calculated and then plotted as a function of the depth below the location of each contour, see Table 8 and FIG. 10.

TABLE 8

The average hardness per contour
(all HV values at a given distance below surface).

| | | | HV3 average Depth below surface | | |
|---|---|---|---|---|---|
| | HV3 (0.3 mm) − HV3 (4.8 mm) | HV3 (0.3 mm) − HV3 (1.2 mm) | 0.3 mm | 1.2 mm | 4.8 mm (bulk) |
| Reference A 29 min | 51 | 27 | 1494 | 1467 | 1443 |
| Reference A 60 min | 60 | 40 | 1516 | 1476 | 1456 |
| Cr-grade A 29 min | 65 | 42 | 1473 | 1431 | 1408 |
| Cr-grade A 60 min | 66 | 45 | 1479 | 1434 | 1413 |

It is seen that the high-energy oscillating collision method used herein requires very short times from <10 min up to 60 min to create high compressive stresses and hardening of the binder in the surface zone. Such a treatment significantly increases the resistance towards earlier failure due to high impact forces but since it is located and homogenously distributed over the surface it will also prevent other types of failures during handling. The method also gives a significant increase of the hardness (HV3) all over of the surface and a few mm inwards of the insert compared to the bulk hardness (=initial sintered hardness) and the increase in hardness and failure resistance at impacts are higher for the Cr-grade than for the standard reference WC-Co grade.

It is also seen that the hardness increase of the surface zone is significant already after 17 min treatment but the increase in surface hardening for a Cr-containing grade is significantly larger when continuing the treatment even further.

Example 5, Treatments of Drill Inserts (Cr-Grade C)

Drill bit inserts were pressed and sintered according to the description in example 3. The inserts had a size of 10.0 mm in outer diameter (OD) and 16.6 mm in height with a weight of approximately 16.6 g each and having a spherical dome ("cutting edge"). The inserts were ground on the negative part but leaving the dome (cutting edge) and bottom part in an as-sintered condition. The batch was then divided and some of the inserts were treated using a standard vibrational tumbling (denoted as "VT" in figures and tables) to remove sharp edges created after the grinding. The vibrational tumbling method also induces a low amount of compressive stresses in the surface zone. This vibrational tumbling was carried out for 1.5 or 3 h in a vibrational mill together with a large excess (30 kg) of hard metal tumbling media of Sandvik grade 10HF with a hardness of around 1600 HV30 and 1 liter of water.

For Cr-grade C, the magnetic coercivity (Hc) was measured on 25 inserts then 20 of those were subjected to the E-treatment method according to the description in example 5. The E-treatment time was 29 min.

Hc Results for Cr-Grade C

The magnetic coercivity was measured on each insert and the average Hc was calculated as well as the Hc increase in % versus the non-treated inserts. The results are shown in Table 9.

TABLE 9

| | Cr-grade C | | |
|---|---|---|---|
| Treatment | Hc (kA/m) | ΔHc (%) | No. of samples |
| untreated (OD-ground) | 6.92 | 0 | 25 |
| VT 1.5 h | 7.05 | 1.97 | 5 |
| 29 min E | 7.65 | 10.7 | 10 |

The results show that for Cr-grade C (11 wt % Co and 1.1 wt % Cr) the increase in magnetic coercivity (Hc) is very high around 11% already after 29 min E-treatment.

Hardness Measurements on Cr-Grade C

The hardness was also measured on both an untreated and treated sample of Cr-grade C by performing Vickers indentations as described in Example 4.

Figure 11:
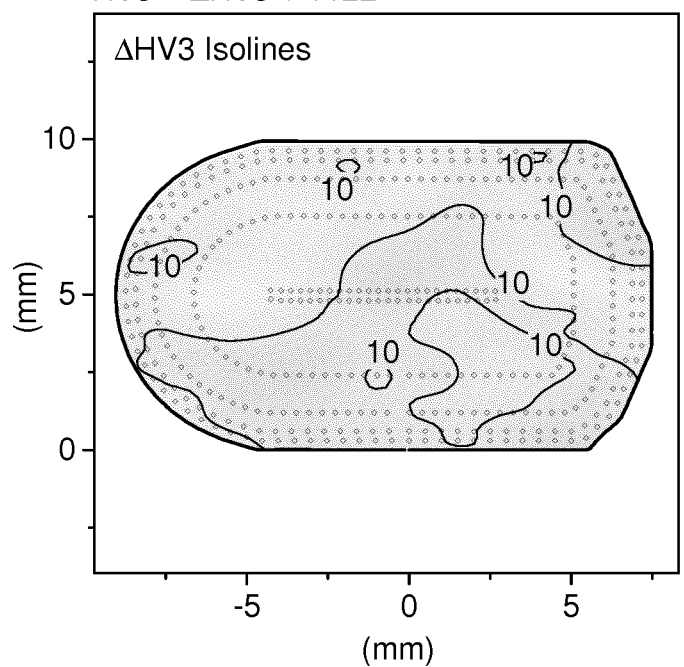
FIG. 11 shows a HV3 map of an untreated rock drill insert where the cemented carbide contains 11 wt % cobalt and 1.1 wt % chromium (Cr-grade C).
Figure 12:
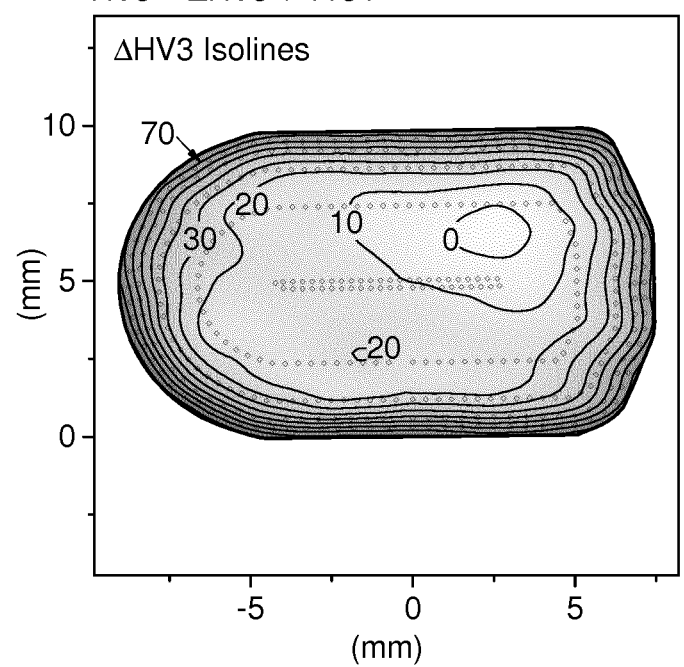
FIG. 12 shows a HV3 map of a high-energy oscillation collision treated rock drill insert where the cemented carbide contains 11 wt % cobalt and 1.1 wt % chromium (Cr-grade C).
Figure 13:
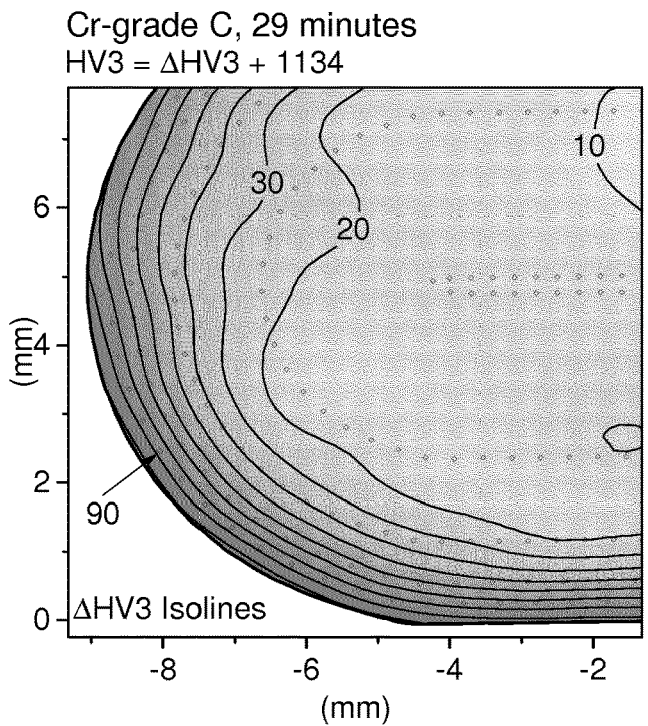
FIG. 13 shows an enlarged HV3 map of a part of a high-energy oscillation collision treated rock drill insert where the cemented carbide contains 11 wt % cobalt and 1.1 wt % chromium (Cr-grade C).

In addition to Hc measurement, hardness mapping was carried out on an insert sectioned following 29 minutes of E-treatment, using the same procedure as described in Example 4. The obtained hardness maps are shown in FIG. 11-13. The figures show surface hardness increased by HV3 of 70 as compared to the bulk hardness. The results are in agreement with the particularly high measured increase in Hc.

Table 10 shows the ten measured minimum hardness values and the ten measured maximum hardness values out of about 390 measured hardness values on each sample examined. This shows that there are some very hard surface zones present.

TABLE 10

| Cr-grade C, Cr-grade C, 29 min E | |
|---|---|
| HV3min[1] | HV3max[2] |
| 1122 | 1238 |
| 1122 | 1238 |
| 1124 | 1238 |
| 1126 | 1241 |
| 1126 | 1243 |
| 1126 | 1248 |
| 1126 | 1250 |
| 1128 | 1252 |
| 1128 | 1252 |
| 1130 | 1259 |

[1]Measured in the bulk (4.8 mm below the surface)
[2]Measured 0.3 mm below the surface Table 11 shows the calculated average hardness in the bulk, 4.8 mm below the surface) and at 0.3 mm below the surface, respectively.

TABLE 11

| Cr-grade C, average hardness per contour (all HV values at a given distance below surface) | | | | | |
|---|---|---|---|---|---|
| | | | HV3 average Depth below surface | | |
| | HV3 (0.3 mm) – HV3 (4.8 mm) | HV3 (0.3 mm) – HV3 (1.2 mm) | 0.3 mm | 1.2 mm | 4.8 mm (bulk) |
| Cr-grade C 29 min | 70 | 53 | 1216 | 1163 | 1146 |

Figure 14:
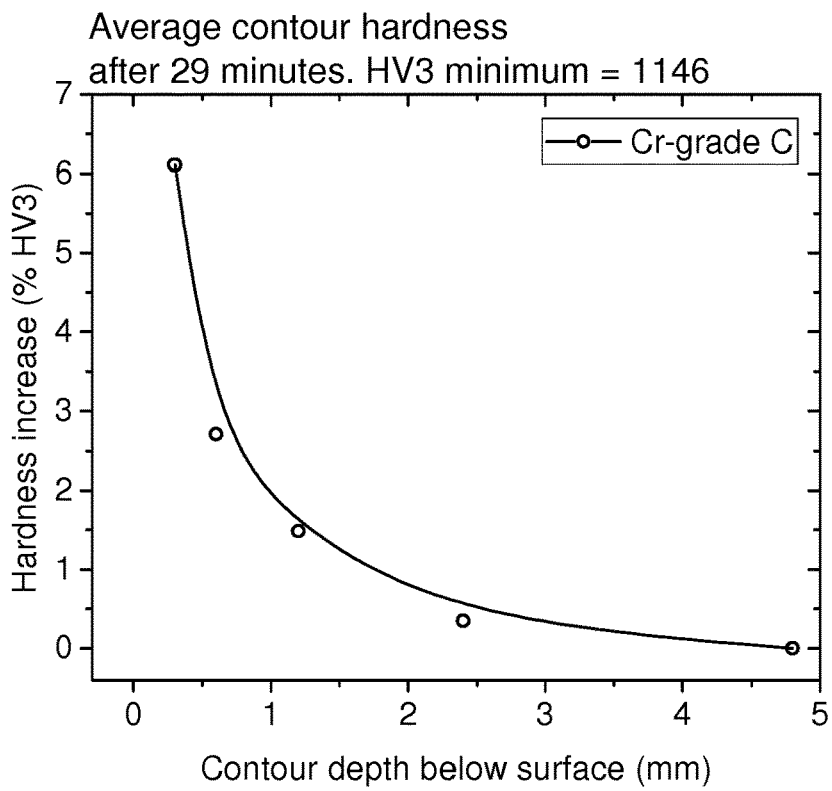
FIG. 14 shows a HV3 profile curve for a high-energy oscillation collision treated rock drill insert of Cr-grade C.

The average hardness per contour was then plotted as a function of the depth at which each contour was located, see FIG. 14.

Figure 15:
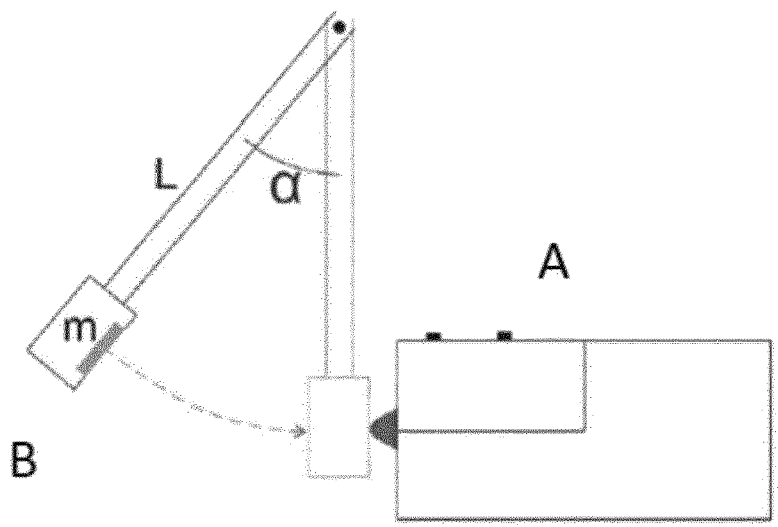
FIG. 15 shows a schematic drawing of a pendulum hammer test set-up (see Example 6)
Figure 16:
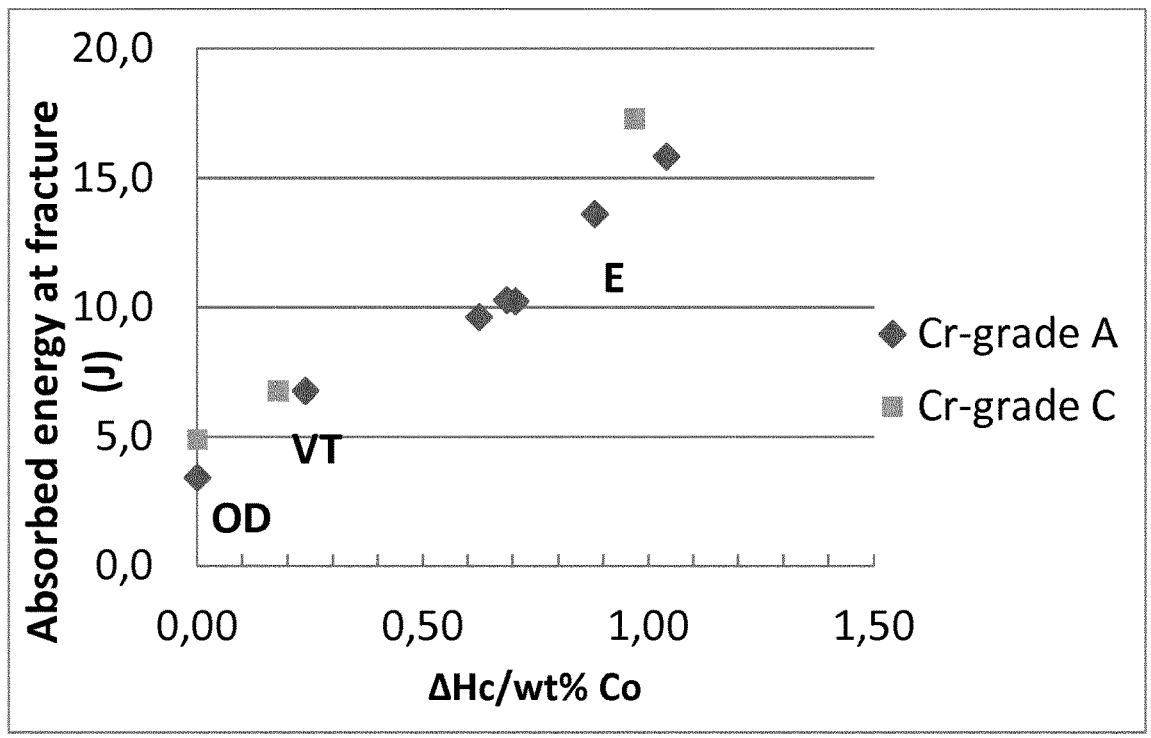
FIG. 16 shows a diagram where the ratio change in magnetic coercivity over cobalt content is plotted versus absorbed energy at fracture in the pendulum hammer test.

Example 6, Impact Toughness of Material with 6 wt. % Cobalt, Reference A and Cr-Grade A The impact toughness of reference A and Cr-grade A in an as-sintered state, following vibrational tumbling, and following E-treatment was tested using a pendulum hammer impact test. A schematic drawing of the pendulum hammer test set-up is shown in FIG. 15. The test procedure used is as follows:

A mining insert with a dome shaped tip of 5.0 mm radius and a diameter of 10.0 mm is firmly mounted into a holder (A) with only the dome section protruding. On the pendulum (B) a hard counter surface is mounted, depicted in FIG. 15 as a light grey area on the pendulum hammer head. The counter surface used was a polished SNGN plate (h=5.00 mm, l=19.40 mm, w=19.40 mm) of a hard fine grained hard metal grade having a Vickers hardness (HV30) of approx. 1900.

When the pendulum is released, the counter surface hits the sample tip. If the sample fails, the impact energy absorbed by the sample AE (in Joules) is, for a given initial pendulum angle, calculated using equation 5.

$$AE = (m_{tot} \times g \times L \times (1-\cos(\alpha))) \quad (5)$$

Where m is the total mass of the pendulum hammer 4.22 kg, g is the gravitational constant 9.81 m/s², L is the pendulum hammer length 0.231 m and a is the angle in radians.

To determine the energy needed to fracture the sample, it is first impacted by the pendulum released from a suitable low angle. The angle is then increased step-wise with a 5 degree step until the sample fails. The sample is impacted once at each impact energy level (angle). A visible crack or spalling is considered as sample failure. The first test starting from the low impact energy level is not counted as valid in the evaluation. In the following tests, used in the evaluation, the angle is lowered by 5 degrees from the angle at which failure was first observed, and subsequently increased again with a finer 3 degree step until failure is reached again. The target result is such that each insert fails at the second angle (impact), however, some of the inserts failed only at the third impact. These were also counted as valid results. Inserts which failed on the first impact were not included in the evaluation. In these tests the counter surface was exchanged every 5-10 impacts. The obtained results for Reference A and Cr-grade A as a function of different surface treatments are presented in tables 12 and 13.

TABLE 12

Reference A

| Treatment | Absorbed energy at failure (J) | ΔAE (%) | No. of valid tests/samples |
|---|---|---|---|
| untreated (OD-ground) | 3.42 | 0 | 4 |
| VT 3 h | 6.30 | 84 | 4 |
| VT + 9 min E | 9.23 | 170 | 3 |
| VT + 17 min E | 11.1 | 226 | 4 |
| 17 min E | 10.9 | 219 | 3 |
| 29 min E | 14.9 | 336 | 3 |
| 60 min E | 15.0 | 339 | 3 |

TABLE 13

Cr-grade A

| Treatment | Absorbed energy at failure (J) | γAE (%) | No. of valid tests/samples |
|---|---|---|---|
| untreated (OD-ground) | 3.42 | 0 | 4 |
| VT 3 h | 6.77 | 98 | 4 |
| VT + 9 min E | 9.60 | 181 | 3 |
| VT + 17 min E | 11.1 | 226 | 4 |
| 17 min E | 10.3 | 201 | 4 |
| 29 min E | 13.6 | 298 | 2 |
| 60 min E | 15.8 | 363 | 3 |

In tables 12 and 13: ΔAE in percentage is calculated as:

$$\Delta AE = ((\text{Average } AE(\text{Treated}) - \text{Average } AE(\text{OD-ground}))/\text{Average } AE(\text{OD-ground}))*100$$

where AE is the absorbed energy at fracture.

Despite that the Cr-grade A contained $M_7C_3$ precipitations in the microstructure the impact toughness was in the same range as the standard WC-Co grade (reference grade A). The response of the vibrational tumbling and E-treatment regarding the increase in absorbed energy at fracture is shown in table 13. The E-treatment gave a significant improvement compared to the as sintered and OD-ground inserts as well as compared with the standard vibrational tumbled inserts. The response for the E-treatment seemed to have reached a maximum for the WC-Co grade (Ref A) after 60 min while the AE still was increasing for the Cr-grade A, which after 60 min E-treatment showed an increase in AE of 363% compared with an increase of AE of 339% for Ref A.

Example 7, Toughness of Materials with 11 wt. % Cobalt—Cr-Grade B and Reference B Toughness of materials Cr-grade B and Reference B, both containing 11 wt. % cobalt, was characterized using the insert compression test, which is an alternative to the pendulum hammer test used in example 6.

The materials were produced as follows:

The material denoted as Cr-grade B, containing 11.0 wt. % Co, 1.1 wt. % Cr and balance WC, was produced in accord with established cemented carbide processes.

Powders of 37.9 kg WC, 5.0 kg Co, 0.56 kg $Cr_3C_2$ and 663 g W were milled in a ball mill for a total of 13.25 hours. The WC powder grain size measured as FSSS before milling was 17 μm. During milling, 15.4 g C was added to reach the desired carbon content. The milling was carried out in wet conditions, using ethanol, with an addition of 2 wt. % polyethylene glycol (PEG 8000) as organic binder (pressing agent), and 120 kg WC-Co cylpebs milling media in a 30 litre mill. After milling, the slurry was spray-dried in $N_2$-atmosphere. Green bodies were produced by uniaxial pressing and sintered by using Sinter-HIP in 55 bar Ar-pressure at 1410° C. for 1 hour.

The chromium-free reference material denoted as Reference B, containing 11.0 wt. % Co and balance WC, was produced in accord with established cemented carbide processes. Powders of WC, Co and W were milled in a 600 l ball mill together with cemented carbide milling bodies for a total of 11 hours. The WC grain size before milling measured as FSSS was 11 μm. The milling was carried out in wet conditions, using 92% ethanol, with an addition of 2 wt. % polyethylene glycol (PEG 8000) as organic binder. After milling, the slurry was spray-dried in $N_2$-atmosphere. Green bodies were produced by uniaxial pressing and sintered by using Sinter-HIP in 55 bar Argon-pressure at 1410° C. for 1 hour.

The properties of the two materials are summarized in Table 14 below. The mean WC grain size was evaluated using the modified Jeffries method described in detail in Example 3, with magnifications of 1000× and 2000× for Cr-grade B and Reference B, respectively.

TABLE 14

Selected properties of Reference B and Cr-grade B materials.

| Material | Reference B | Cr-grade B |
|---|---|---|
| Co nominal (wt. %) | 11 | 11 |
| Cr nominal (wt. %) | — | 1.1 |
| Mean WC grain size (μm) | 3.5 | 4.9 |
| Porosity | A00B00C00 | A00B00C00 |
| $H_C$ (kA/m) | 5.97 | 5.49 |
| Weight-specific magnetic saturation ($10^{-7} \cdot T \cdot m^3/kg$) | 210 | 167 |
| Density (g/cm³) | 14.44 | 14.27 |
| HV3* | 1110 | 1095 |

*Vickers hardness with 3 kg load

Drill bit inserts with a nominal outer diameter of 10 mm and a hemispherical top section were pressed and sintered out of Reference B and Cr-grade B as described above. For each of the two materials, a part of the inserts from the same batch were tested in the as sintered condition, while another part of the inserts were tested following 5 minutes of treatment using the E-method described in Example 4. The E-treatment procedure and operating parameters were identical to those described in Example 4, as was the geometry of the inserts, with the exception of the absence of the OD grinding step, and the shorter 5 minutes treatment time.

The insert compression (IC) test method involves compressing a drill bit insert between two plane-parallel hard counter surfaces, at a constant displacement rate, until the failure of the insert. A test fixture based on the ISO 4506: 2017 (E) standard "Hardmetals—Compression test" was used, with cemented carbide anvils of hardness exceeding 2000 HV, while the test method itself was adapted to toughness testing of rock drill inserts. The fixture was fitted onto an Instron 5989 test frame. The loading axis was identical with the axis of rotational symmetry of the inserts.

The counter surfaces of the fixture fulfilled the degree of parallelism required in the ISO 4506:2017 (E) standard, i.e. a maximum deviation of 0.5 μm/mm. This is of great importance for the test alignment and repeatability of the results. The tested inserts were loaded at a constant rate of crosshead displacement equal to 0.6 mm/min until failure, while recording the load-displacement curve. The test rig and test fixture compliance was subtracted from the measured load-displacement curve before test evaluation. 3 inserts were tested per material and treatment. The counter surfaces were inspected for damage before each test. Insert failure was defined to take place when the measured load suddenly dropped by at least 1000 N. Subsequent inspection of tested inserts confirmed that this in all cases coincided with the occurrence of a macroscopically visible crack.

The material toughness was characterized by means of the total absorbed deformation energy until fracture, denoted as $AE_{IC}$. $AE_{IC}$ was calculated for each test as the total area under the measured load-displacement curve until fracture. Table 15 shows the average values of $AE_{IC}$ obtained for the Reference B and Cr-grade B materials in the as sintered state and after 5 minutes of E-treatment, respectively. $\Delta AE_{IC}$, the average percental increase in absorbed energy following the treatment, is also included in the table. The increase was calculated from the average of the absorbed energy values as:

$$\Delta AE_{IC} = ((AE_{IC\ treated} - AE_{IC\ as\ sintered}) / AE_{IC\ as\ sintered}) * 100$$

TABLE 15

Absorbed energy in the insert compression test.

| Material | Reference B | Cr-grade B |
| --- | --- | --- |
| $AE_{IC}$ (as sintered) (J) | 2.19 | 1.55 |
| $AE_{IC}$ (treated 5 min E-method) (J) | 11.16 | 9.61 |
| $\Delta AE_{IC}$ (%) | 410 | 520 |

It can be seen from the test results that even the short E-method treatment time of 5 minutes resulted in a dramatic increase of the absorbed energy. The effect of the treatment was clearly more pronounced for the chromium containing Cr-grade B, with $\Delta AE_{IC}$ of 520% as compared to the 410% obtained with the chromium-free Reference B, despite the equal cobalt content of the two materials.

Example 8, Abrasion Wear Testing

Rock drill bit inserts (Ø10 mm OD, spherical front) according to examples 1, 2 and 3 were tested in an abrasion wear test, wherein the sample tips are worn against a rotating granite log counter surface in a turning operation. The test parameters used were as follows: 200 N load applied to each insert, granite log rpm=230, log circumference ranging from 44 to 45 cm, and a horizontal feed rate of 0.339 mm/rev. The sliding distance in each test was constant at 150 m and the sample was cooled by a continuous flow of water. Each sample was carefully weighed prior to and after the test. Mass loss of one to two samples per material was evaluated after 150 m sliding distance. Sample volume loss for each of the tested materials and different surface treatments, calculated from the measured mass loss and sample density, is presented in table 16.

The abrasion wear test results clearly show significantly increased wear resistance for the material according to the invention Cr-grade A, as compared to the reference material Reference A, in spite of the fact that Reference A had a higher bulk hardness, as well as a smaller sintered WC-grain size. Further improvement in wear resistance was observed for the inserts that had been subjected to the E-method surface treatment for 29 min.

TABLE 16

Results as sample wear measured in the abrasion wear test.

| Sample material | Treatment | Volumetric wear of each specimen (mm³) | Average volumetric wear (mm³) |
| --- | --- | --- | --- |
| Reference grade A (According to example 1) | As sintered dome | 0.180 0.193 | 0.186 |
| Reference grade A | VT 3 h | 0.140 0.153 | 0.146 |
| Reference grade A | VT + 29 min E | 0.133 0.126 | 0.130 |
| Cr-grade A (According to example 3) | VT 3 h | 0.101 0.101 | 0.101 |
| Cr-grade A | VT + 29 min E | 0.094 0.087 | 0.091 |

Example 9, Results from a Wet Underground Top Hammer Application Test

Ref A and CrA inserts with a diameter of 11 and 13 mm and with spherical shaped dome geometries were manufactured according to the description in Example 1 and 2. The outer diameter of all inserts were ground and then each grade batch was divided into two parts. Half of the inserts were low energy post treated (LE) according to standard procedures to achieve a Hc increase of about 1% and the other half of the inserts were high energy post treated (HE) to achieve a Hc increase of 3-4%. The HE treatment is a more severe treatment than vibrational tumbling but not as severe as the E-method used in some previous examples. The limitation in this example was the maximum impact frequency and energy range possible in the commercial centrifugal tumbling equipment "ERBA Turbo 120" used. The HE treatment used in this example is thus different from the E-method described in Example 4 but is an alternative high energy treatment method. The LE- and HE-treatments were performed exactly the same way for Ref. A and CrA. The LE treatment was performed by centrifugal tumbling at 160 RPM for 30 minutes in a 120 litres machine having a rotation disc of 650 mm in diameter together with 150 kg of tumbling media and water as cooling media. The HE treatment was performed by centrifugal tumbling at 240 RPM for 80 minutes plus 10 minutes holding times during the ramping at 190 and 220 rpm respectively, in a 120 litres machine having a rotation disc of 650 mm in diameter together with 150 kg of tumbling media and water as cooling media. The tumbling media in both LE and HE consists of cemented carbide bodies of Sandvik grade H10F with a shape close to spherical balls of 7 mm diameter.

The coercivity, Hc, was measured on 8 to 10 random inserts prior and after the post treatments and the average values were calculated. These average values for 13 mm inserts that were used in the periphery (gauge) positions of the bits are found in table 17.

One insert of each variant was cross sectioned, polished and HV3-mapped as described in Example 4 and the results are shown in table 18.

TABLE 17

|  | Hc (ground) (kA/m) | Hc (post treated) (kA/m) | ΔHc (%) | ΔHc/Co (%/wt %) |
|---|---|---|---|---|
| Ref A + LE | 11.64 | 11.75 | 1.0 | 0.2 |
| Ref A + HE | 11.64 | 12.02 | 3.2 | 0.5 |
| CrA + LE | 10.39 | 10.50 | 1.0 | 0.2 |
| CrA + HE | 10.39 | 10.74 | 3.4 | 0.6 |

TABLE 18

Average hardness per contour
(all HV values at a given distance below surface)

|  | HV3 (0.3 mm, surface) | HV3 (1.2 mm) | HV3 (6.2 mm, bulk) | ΔHV3 (0.3-1.2 mm) | ΔHV3 (0.3-6.2 mm) |
|---|---|---|---|---|---|
| Ref A + LE | 1462 | 1450 | 1439 | 12 | 23 |
| Ref A + HE | 1493 | 1464 | 1443 | 29 | 47 |
| CrA + LE | 1420 | 1409 | 1403 | 17 | 11 |
| CrA + HE | 1448 | 1419 | 1405 | 29 | 43 |

The inserts made with the different cemented carbide grades and treatments were mounted into 76 mm drill bits. Five bits/variant were produced and tested in an underground mine in central Sweden in a top hammer application. The rock conditions were mostly classified as very hard and very abrasive. Before starting drilling the maximum diameter of each bit was carefully measured and noted and the starting diameter of the bits was around 78 mm. The drilling was started and each bit was used until the inserts were too blunt and the penetration rate went down. The maximum diameter of the bit was then measured, noted and after that the inserts on the bits were re-ground/re-sharpened, the maximum diameter was measured again and the drilling continued until the penetration rate went down. The same procedure was repeated until the maximum diameter of the bit was equal to or below 72 mm. The results from the test were evaluated as total drill meters/variant, average wear from drilling, number of bits with insert breakage(s) and number of bits worn down or taken out due to insert failures as shown in table 19.

TABLE 19

Results from field test

|  | Number of bits | Total drilled meters (DM) (m) for all 5 bits | Drill meters DM/mm diameter wear | Average diameter wear from drilling (mm/m) | Number of bits with insert breakages | Number of bits worn out[1] or taken out[2] |
|---|---|---|---|---|---|---|
| Ref A + LE | 5 | 346 | 13.23 | 0.076 | 1 | 4 |
| Ref A + HE | 5 | 359 | 13.88 | 0.072 | 0 | 4 |
| CrA + LE | 5 | 344 | 16.74 | 0.060 | 1 | 3 |
| CrA + HE | 5 | 411 | 20.12 | 0.050 | 0 | 1 |

[1]Bit diameter < 72 mm
[2]Insert failure

The results show clearly that CrA+HE, even with a relatively soft HE-treatment, has the best wear resistance, longest bit life and that no premature failures due to insert breakages were observed. By combining a Cr-containing grade with a HE-treatment the full potential of the material can be utilized and the HE-treatment also further increases the wear resistance.

Example 10, Results from a Dry Surface Mining Top Hammer Application Test

Ref A and CrA inserts with diameter 12 and 13 mm and with spherical shaped dome geometries were manufactured according to the description in Example 1 and 2. Each grade batch was then divided into two parts and half of the inserts were low energy post treated (LE) according to standard procedures to achieve a Hc increase of about 1%, while the other half of the inserts were high energy post treated (HE) to achieve a Hc increase of 3-4%. The HE treatment is a more severe treatment than vibrational tumbling but not as severe as the E-method used in some previous examples. The limitation in this example was the maximum impact frequency and energy range possible in the commercial centrifugal tumbling equipment "ERBA Turbo 120" used. The HE treatment used in this example is thus different from the E-method described in Example 4, but is an alternative high energy treatment method. The LE and HE-treatments were performed exactly the same way for Ref. A and CrA. The LE treatment was performed by centrifugal tumbling at 160 RPM for 30 minutes in a 120 litres machine having a rotation disc of 650 mm in diameter together with 150 kg of tumbling media and water as cooling media. The HE treatment was performed by centrifugal tumbling at 260 RPM for 80 minutes in a 120 litres machine having a rotation disc of 650 mm in diameter together with 150 kg of tumbling media and water as cooling media. The tumbling media in both LE and HE consists of cemented carbide bodies of Sandvik grade H10F with a shape close to spherical balls of 7 mm diameter. The HE-process also included a ramping step of 2 minutes at 160 rpm, 5 minutes at 190 rpm, 10 minutes at 210 rpm and 10 minutes at 240 rpm to get a stable tumbling process before the maximum rpm was reached.

The coercivity, Hc, was measured on 8 to 10 random inserts prior and after the post treatments and the average values were calculated. These average values for 13 mm inserts that were used in the periphery (gauge) positions of the 89 mm bits are found in table 20.

One insert of each variant was cross sectioned, polished and HV3-mapped as described in Example 4 and the results are shown in table 21.

TABLE 20

|  | Hc (ground) (kA/m) | Hc (post treated) (kA/m) | ΔHc (%) | ΔHc/Co (%/wt %) |
|---|---|---|---|---|
| Ref A + LE | 11.60 | 11.71 | 0.9 | 0.2 |
| Ref A + HE | 11.60 | 11.99 | 3.3 | 0.6 |

TABLE 20-continued

|  | He (ground) (kA/m) | He (post treated) (kA/m) | ΔHc (%) | ΔHc/Co (%/wt %) |
|---|---|---|---|---|
| CrA* + LE | 9.53 | 9.67 | 1.5 | 0.2 |
| CrA* + HE | 9.53 | 9.92 | 4.1 | 0.7 |

*Due to slight differences between sintering furnaces and sintering batches the Hc of CrA was lower than in Example 2 and Example 9, but this is within the normal variation of a grade.

TABLE 21

Average hardness per contour
(all HV values at a given distance below surface)

|  | HV3 (0.3 mm, surface) | HV3 (1.2 mm) | HV3 (6.2 mm, bulk) | ΔHV3 (0.3-1.2 mm) | ΔHV3 (0.3-6.2 mm) |
|---|---|---|---|---|---|
| Ref A + LE | 1453 | 1441 | 1436 | 12 | 17 |
| Ref A + HE | 1482 | 1455 | 1445 | 27 | 37 |
| CrA + LE | 1389 | 1379 | 1370 | 10 | 19 |
| CrA + HE | 1435 | 1397 | 1388 | 38 | 47 |

The inserts made with the different cemented carbide grades and treatments were mounted into drill bits. 5 bits/variant were produced and tested in a surface mine in the north of Sweden in a top hammer application. The rock conditions were mostly classified as hard and medium abrasive. Before starting drilling the maximum diameter of each bit was carefully measured (~92 mm) and noted. The drilling was started and each bit was used until the inserts were too blunt and the penetration rate went down. The maximum diameter of the bit was then measured and after that the inserts were then re-ground, the maximum diameter was measured again and the same procedure was repeated until the diameter of the bit was equal or below 85 mm. The results from the test, presented in table 22, were evaluated as total drill meters, average wear from drilling, number of bits with insert failure(s) and total number of bits run until their end of life (worn to the minimum diameter or due to insert failures).

TABLE 22

Results from field test

|  | Number of bits | Total drilled meters (DM) (m) for all 5 bits | Average diameter wear from drilling (mm/m) | Number of bits with insert failures | Number of bits worn out[1] or taken out[2] |
|---|---|---|---|---|---|
| Ref A + LE | 5 | 665 | 0.0084 | 2 | 2 |
| Ref A + HE | 5 | 749 | 0.0104 | 0 | 1 |
| CrA + LE | 5 | 678 | 0.0067 | 2 | 3 |
| CrA + HE | 5 | 744 | 0.0066 | 0 | 1 |

[1]Bit diameter < 85 mm
[2]Insert failure

In this test the benefit of combining Cr-containing grades with a HE-treatment is clearly shown, since the number of bit failures due to insert breakages for CrA+LE is two out of five, while for CrA+HE the number of insert breakage related failures is zero. The premature insert failures when not using the high energy post treatment reduce the possibility to fully benefit from the increased wear resistance of the CrA material.

The invention claimed is:

1. A rock drill insert comprising a body of cemented carbide including hard constituents of tungsten carbide (WC) in a binder phase including Co, wherein the cemented carbide includes 4-18 mass % Co, and a balance of WC and unavoidable impurities, and wherein the cemented carbide also includes Cr in such an amount that the mass ratio Cr/Co is 0.04-0.19 in a bulk of the body, a difference between a hardness at any point of a surface of the rock drill insert and the hardness of the bulk of the body being at least 40 HV3, wherein content of the binder phase of the cemented carbide is substantially equal throughout the rock drill insert.

2. The rock drill insert according to claim 1, wherein the difference between the hardness at any point of the surface of the rock drill insert and the hardness of the bulk is at least 60 HV3.

3. The rock drill insert according to claim 1, wherein the difference between the hardness at any point 0.3 mm below the surface of the rock drill insert and the hardness at 1 mm below the surface of the rock drill insert is at least 20 HV3.

4. The rock drill insert according to claim 1, wherein the difference between an average hardness at 0.3 mm below the surface of the rock drill insert and an average hardness at 1 mm below the surface of the rock drill insert is at least 30 HV3.

5. The rock drill insert according to claim 1, wherein the difference between an average hardness at 0.3 mm below the surface of the rock drill insert and an average hardness in the bulk of the rock drill insert is at least 50 HV3.

6. The rock drill insert according to claim 1, wherein a WC grain size mean value of the cemented carbide is above 1 μm but less than 18 μm.

7. The rock drill insert according to claim 1, wherein a WC grain size mean value of the cemented carbide is above 1.5 μm but less than 10 μm.

8. The rock drill insert according to claim 1, wherein the cemented carbide includes 5-12 mass % Co.

9. The rock drill insert according to claim 1, wherein the mass ratio Cr/Co in the cemented carbide is 0.075-0.15.

10. The rock drill insert according to claim 1, wherein the mass ratio Cr/Co in the cemented carbide is 0.085-0.12.

11. The rock drill insert according to claim 1, wherein said cemented carbide has a hardness of not higher than 1700 HV3.

12. The rock drill insert according to claim 1, wherein said cemented carbide has a percentage difference $\Delta Hc_{21}$ between a magnetic coercivity $Hc_2$ of the rock drill insert and a magnetic coercivity $Hc_1$ of a heat treated inner part of the rock drill insert $\Delta Hc_{21}=(Hc_2-Hc_1)/Hc_1*100$, the ratio $\Delta Hc_{21}/Co$ is >0.6, with the coercivity Hc in kA/m, $\Delta Hc_{21}$ in % and the cobalt content Co in weight %.

13. A rock drill bit body comprising one or more mounted rock drill inserts according to claim 1.

* * * * *